United States Patent
Bartkowiak

[11] Patent Number: 6,046,977
[45] Date of Patent: Apr. 4, 2000

[54] METHOD AND APPARATUS FOR DETECTING SIGNAL MISALIGNMENT

[75] Inventor: John G. Bartkowiak, Austin, Tex.

[73] Assignee: Advanced MicroDevices, Inc., Austin, Tex.

[21] Appl. No.: 09/159,028

[22] Filed: Sep. 23, 1998

[51] Int. Cl.$^7$ ........................................ H04M 3/00
[52] U.S. Cl. .......................... 370/210; 370/526; 370/503; 379/386
[58] Field of Search ..................................... 379/386, 283, 379/382, 383; 370/345, 210, 503, 509, 525, 526; 455/426

[56] References Cited

U.S. PATENT DOCUMENTS

| | | | |
|---|---|---|---|
| 5,588,053 | 12/1996 | Xie | 379/386 |
| 5,644,634 | 7/1997 | Xie et al. | 379/386 |
| 5,666,357 | 9/1997 | Jangi | 370/345 |
| 5,699,421 | 12/1997 | Nirshberg et al. | 379/386 |
| 5,722,054 | 2/1998 | Mizutani et al. | 455/88 |
| 5,737,371 | 4/1998 | Jaquette | 375/357 |
| 5,809,133 | 9/1998 | Bartkowiak et al. | 379/386 |
| 5,835,574 | 11/1998 | Lam | 379/90.01 |
| 5,937,059 | 8/1999 | Kim et al. | 379/386 |
| 5,949,874 | 9/1999 | Mark | 379/283 |
| 5,978,676 | 11/1999 | Guridi et al. | 455/426 |

*Primary Examiner*—Chau Nguyen
*Assistant Examiner*—Forood Boortalary
*Attorney, Agent, or Firm*—William, Morgan & Amerson, P.C.

[57] ABSTRACT

A signal detector includes a transform unit and a signal alignment unit. The transform unit is adapted to receive a plurality of frames of time domain input samples and generate a plurality of energy values based on the frames of time domain input samples. Each energy value is associated with one of the plurality of frames. The signal alignment unit is adapted to identify at least a first partial energy frame and a second partial energy frame from the plurality of frames. The first partial energy frame is associated with a first frequency and has a first energy value. The second partial energy frame is associated with a second frequency and has a second energy value. The signal alignment unit determines a misalignment between the first and second partial energy frames based on the first and second energy values. A method for detecting a signal is provided. The method includes generating a plurality of energy values based on the frames of time domain input samples. Each energy value is associated with one of the plurality of frames. At least a first partial energy frame and a second partial energy frame are identified from the plurality of frames. The first partial energy frame is associated with a first frequency and has a first energy value. The second partial energy frame is associated with a second frequency and has a second energy value. A misalignment between the first and second partial energy frames is determined based on the first and second energy values.

29 Claims, 4 Drawing Sheets

METHOD AND APPARATUS FOR DETECTING SIGNAL MISALIGNMENT

BACKGROUND OF THE INVENTION

1. Field of the Invention

This invention relates generally to signal detectors, and, more particularly, to a method and apparatus for detecting a frame-misalignment.

2. Description of the Related Art

Dual tone multifrequency (DTMF) coding is commonly used in telephone systems to transmit information such as a phone number over the connection between a user and a telephone central office. DTMF coding is also becoming popular in interactive control applications, such as telephone banking, electronic mail systems, and answering machines, wherein the user can select options from a menu by sending DTMF signals from a telephone. In applications where a user is dialing a phone number or providing input to an interactive control system, a DTMF detector must discriminate between a valid DTMF signal and speech or noise.

One type of DTMF detection error occurs when the detector erroneously accepts signal imitations, such as those produced by speech or music, as valid signals. This type of error is referred to as talk-off. Another type of detection error occurs when the signal imitation interferes with a valid DTMF signal and prevents it from being detected. This type of error is referred to as talk-down. DTMF detectors have been developed to improve the immunity of the detector to talk-down and talk-off effects.

Methods for detecting DTMF signals are described in U.S. Pat. Nos. 5,588,053 and 5,644,634 issued to Xie et al. (XIE), the specifications of which are herein incorporated by reference in their entireties. In the Xie methods, the analog signal present on the phone line is sampled and transformed to the frequency domain to identify and extract valid DTMF signals. The frequency domain information is analyzed to identify valid DTMF signals and/or reject erroneous signals resulting from speech or noise.

Current telephone systems typically offer services that send a signal to a subscriber (i.e., telephone user) to provide identifying information regarding an incoming call. This service is commonly referred to as Caller ID. The communication of the identifying information occurs only if the user is on-hook (i.e., not using the line). Another common service, commonly referred to as Call Waiting, informs a subscriber currently using the line (i.e., off-hook) that another call is being received.

A new feature has been developed to inform a user currently using the line (i.e. off-hook) that another call is being received from a third party, and to provide identifying information (i.e., Caller ID information) regarding the third party. The user can then decide whether to take or not take the call based on the identity of the third party. To signal the user's telephone system of the incoming third party call, the central office sends a customer premises equipment alerting signal (CAS) on the user's line. The party to which the user is currently communicating does not receive the CAS signal, but it is received by the user's telephone system. The CAS signal is a DTMF encoded signal having a predefined duration. In response to the CAS signal, the user's telephone system enables a modem on the line to detect and receive the Caller ID information. Because the CAS signal may be received during an ongoing conversation, the DTMF detector attempting to identify the CAS signal must have a high immunity to talk-off or talk-down errors.

As defined in proposed United States and international standards, the CAS signal consists of the combination of a 2130 Hz tone and a 2750 Hz tone. As defined by the proposed standard, the DTMF detector should accept the CAS signal if the following parameters are met. The lower tone (2130 Hz) and upper tone (2750 Hz) signals should be accurate in frequency within ±0.5%. The CAS should have a dynamic range of −14 to −32 dBm per tone and a power differential within the dynamic range of 0 to 6 dB between tones. The duration of the CAS signal should be between 75 to 85 ms at the user's equipment (i.e., customer premises equipment). At the central office, the CAS signal tones should start and stop within 1 ms of each other.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others.

A common technique for determining energy values in the frequency domain is performed by transforming the time domain sampling data to frequency domain data using a variant of the discrete Fourier transform (DFT) called the Goertzel algorithm. The Goertzel algorithm is a second-order recursive computation of the DFT using a feedback and a feed-forward phase. The feedback phase computes a new output, $y(n+1)$, for every new input sample $x(n)$, where N is the number of input samples. The feedback phase equation is:

$$y(n+1) = c \cdot y(n) - y(n-1) + x(n), \qquad \text{Equation 1}$$

where c is the Goertzel coefficient:

$$c = 2 \cdot \cos\left(2\pi \frac{f}{F}\right). \qquad \text{Equation 2}$$

In the Goertzel coefficient, $f$ is the frequency to be detected and F is the sampling frequency (i.e., 8 kHz).

The feed-forward phase is normally calculated after the $N^{th}$ data sample is received (i.e., n=N). The feed-forward phase equation provides a single output energy parameter, given by the equation:

$$|Yk(N)|^2 = y(n) \cdot y(n) + y(n-1) \cdot y(n-1) - 2 \cdot c \cdot y(n) \cdot y(n-1), \qquad \text{Equation 3}$$

where $$c = 2 \cdot \cos\left(2\pi \frac{f}{F}\right) = 2 \cdot \cos\left(2\pi \frac{k}{N}\right), \qquad \text{Equation 4}$$

and $$k = \frac{N}{F} \cdot f. \qquad \text{Equation 5}$$

The values for N and k are integers. The choice of the values for k and N for a given tone frequency requires a trade-off between accuracy and speed of detection. As the number of samples, N, increases, the resolution in the frequency domain increases, but the computation time for the feed-forward phase increases. The spacing of the energy output values in the frequency domain from the feed-forward phase is equal to half the sampling frequency divided by N. If the tone being detected, $f$, does not fall exactly on a selected frequency point (i.e., a frequency bin defined by k and N), part of the energy associated with the frequency point appears in the energy output value of an adjacent frequency point. This phenomenon is referred to as leakage. To avoid leakage, the values of k and N are chosen to attempt to center the tone being detected within a frequency bin.

Once the DTMF detector has calculated the energy values for a given frame of data, the DTMF detector performs various tests to ensure that the detected energy meets the above listed criteria for the CAS signal. Previous DTMF detectors have used various thresholding techniques to determine the presence of valid DTMF tones. These prior techniques, to various extents, lack the degree of noise immunity necessary to reliably detect the presence of the CAS signal.

The present invention is directed to overcoming, or at least reducing the effects of, one or more of the problems set forth above.

SUMMARY OF THE INVENTION

One aspect of the present invention is seen in a signal detector including a transform unit and a signal alignment unit. The transform unit is adapted to receive a plurality of frames of time domain input samples and generate a plurality of energy values based on the frames of time domain input samples. Each energy value is associated with one of the plurality of frames. The signal alignment unit is adapted to identify at least a first partial energy frame and a second partial energy frame from the plurality of frames. The first partial energy frame is associated with a first frequency and has a first energy value. The second partial energy frame is associated with a second frequency and has a second energy value. The signal alignment unit determines a misalignment between the first and second partial energy frames based on the first and second energy values.

Another aspect of the present invention is seen in a method for detecting a signal. The method includes generating a plurality of energy values based on the frames of time domain input samples. Each energy value is associated with one of the plurality of frames. At least a first partial energy frame and a second partial energy frame are identified from the plurality of frames. The first partial energy frame is associated with a first frequency and has a first energy value. The second partial energy frame is associated with a second frequency and has a second energy value. A misalignment between the first and second partial energy frames is determined based on the first and second energy values.

BRIEF DESCRIPTION OF THE DRAWINGS

The invention may be best understood by reference to the following description taken in conjunction with the accompanying drawings, in which like reference numerals identify like elements, and in which.

Figure 1:
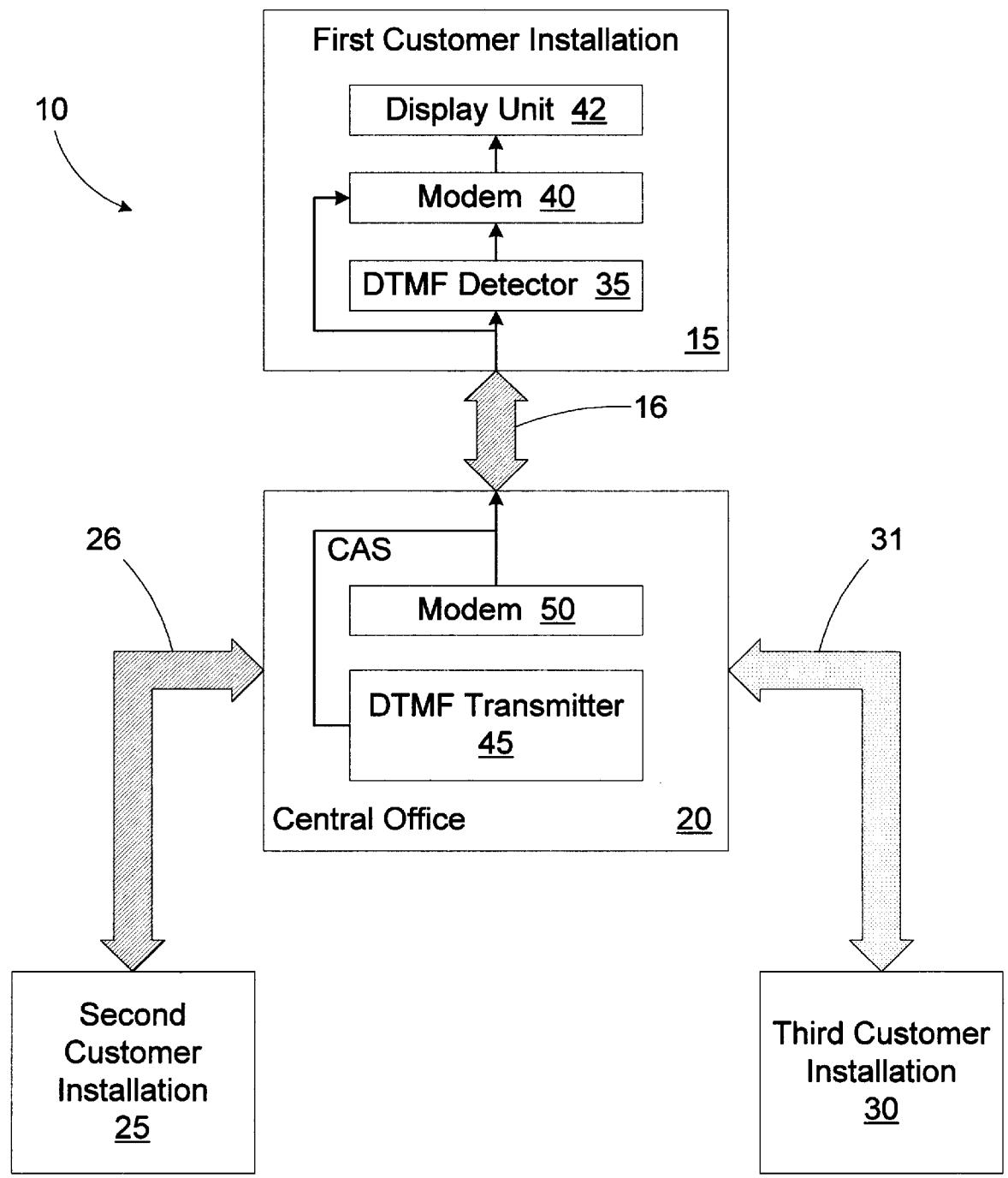
FIG. 1 is a block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the Figures, and particularly, to FIG. 1, a block diagram of a communications system 10 is provided. The communications system 10 includes a first customer installation 15, a central office 20, a second customer installation 25, and a third customer installation 30. The first, second, and third customer installations 15, 25, 30 are connected to the central office 20 by subscriber lines 16, 26, and 31, respectively. The first customer installation 15 includes a dual tone multifrequency (DTMF) detector 35, a modem 40, and a display unit 42. The central office 20 includes a DTMF transmitter 45 and a modem 50.

For purposes of illustration, assume a first party at the first customer installation 15 is communicating with a second party at the second customer installation 25. The communication is routed through the central office 20. The communication could be a voice call or a data call (e.g., computer, fax, etc.). During the communication between the first and second parties, a third party at the third customer installation 30 attempts to place a call to the first customer installation 15. The central office 20 detects the attempt made by the third party and sends a customer alert signal (CAS) through the DTMF transmitter 45 over the subscriber line 16. The central office 20 may also send an audible subscriber alert signal (SAS) over the subscriber line 16 to audibly alert the first party of the impending call. The SAS signal is typically a single frequency tone (e.g., 440 Hz in the Unites States) that is typically sent before the CAS signal.

The DTMF detector 35 receives the CAS signal, detects its presence, and activates the modem 40 to monitor the subscriber line 16. Following the CAS signal (i.e., after some delay), the modem 50 at the central office 20 transmits a digital data stream containing identifying information on the third customer installation 30, presumably about the third party. The identifying information may include the associated phone number, name of the third party, date, time, or other relevant information. The modem 40 at the first customer installation 15 receives the digital data sent by the modem 50 at the central office 20, and provides the identifying information to the display unit 42. Based on the identifying information, the first party may choose to place the second party on hold and accept the call from the third party. Alternatively, the first party may choose to ignore the call from the third party entirely, or call the third party back at a more convenient time.

Figure 2:
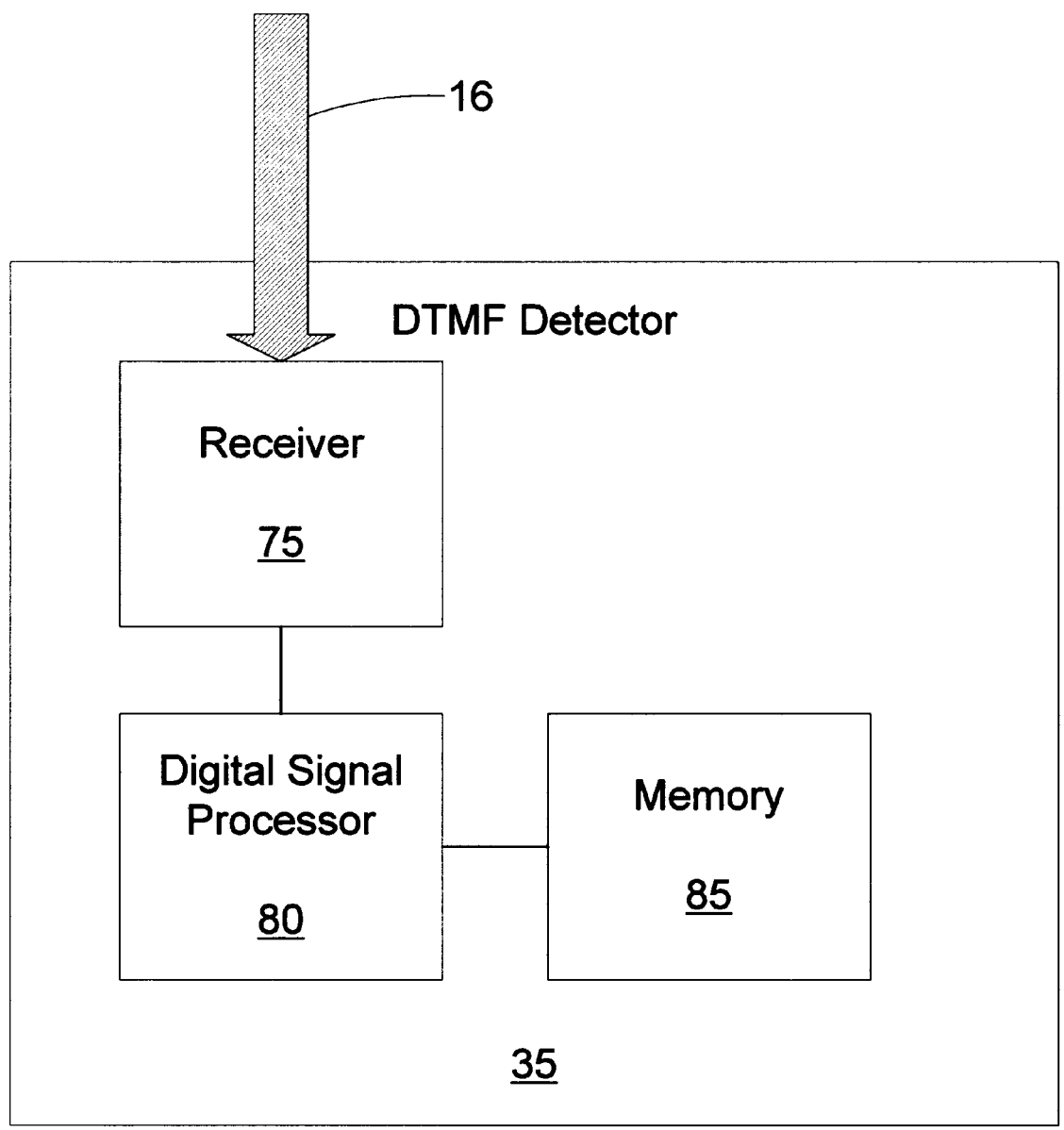
FIG. 2 is physical block diagram of a dual-tone multifrequency detector of FIG. 1.

Referring to FIG. 2, a physical block diagram of the DTMF detector 35 is provided. The DTMF detector 35 includes a receiver 75, a digital signal processor 80, and a memory 85. The receiver 75 is coupled to the subscriber line 16 to receive an analog signal and convert the analog signal into digital format. The receiver 75 samples the analog signal and utilizes pulse code modulation (PCM) or other suitable techniques to produce corresponding digital data. The receiver 75 may include linear analog to digital (A/D) converters (not shown).

It is noted that the received signal may be compressed or companded, and thus digital data produced by the A/D converter (not shown) in the receiver 75 may be companded (i.e., may comprise logarithmically compressed digital data). As is well-known in the art, companding refers to logarithmically compressing a signal at the source and expanding the signal at the destination to obtain a high end-to-end dynamic range while reducing dynamic range requirements within the communication channel. If the signal is companded, the receiver 75 logarithmically expands the data to a linear format. It is also contemplated that the DTMF detector 35 may receive digital signals (i.e., linear or logarithmic) directly from the subscriber line 16, and thus a receiver 75 is not required in the DTMF detector 35 for analog to digital conversion.

Figure 3:
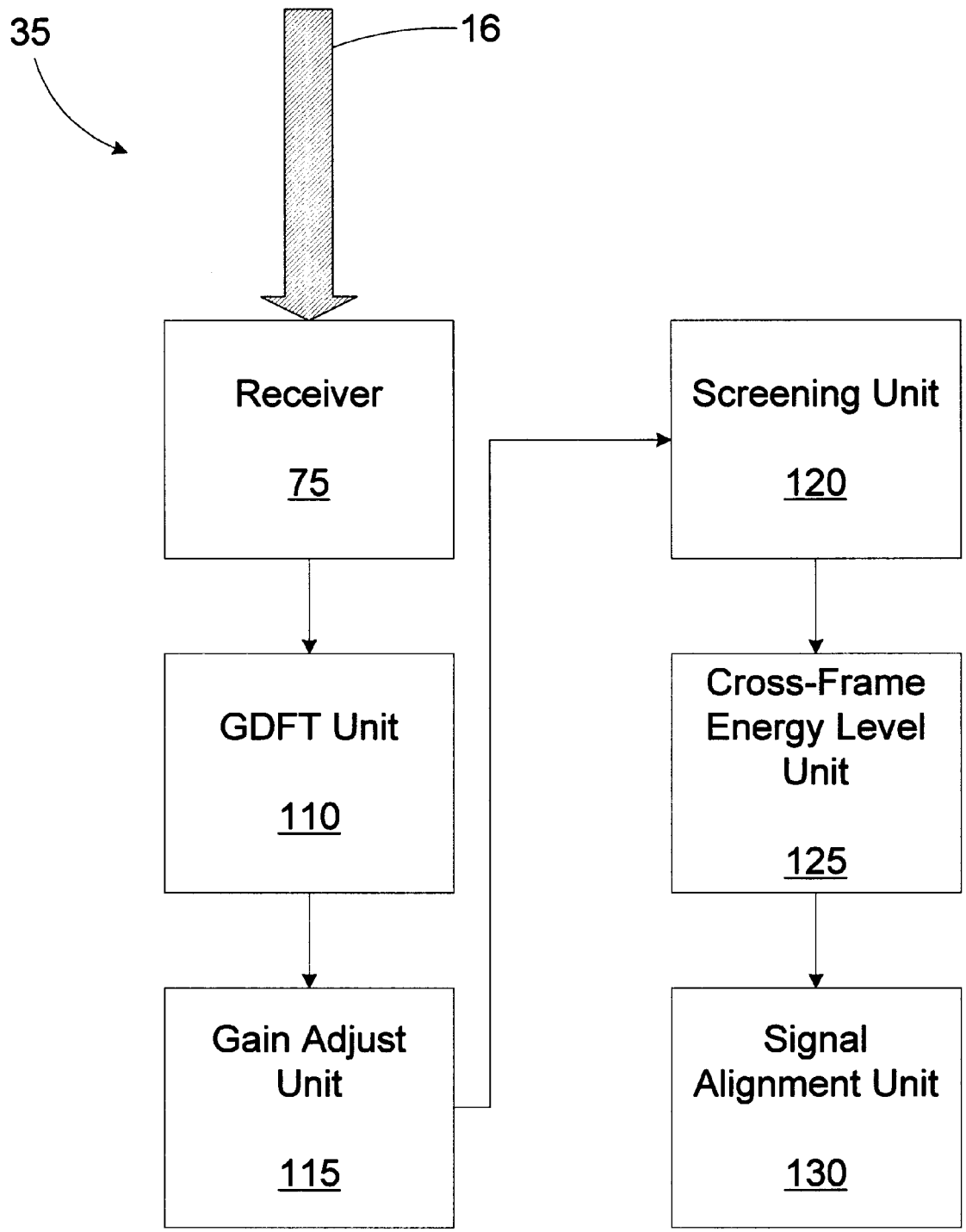
FIG. 3 is a functional block diagram of a dual-tone multifrequency detector of FIG. 1.

A functional block diagram of the DTMF detector 35 is provided in FIG. 3. The DTMF detector 35 includes the receiver 75 adapted to sample the signal present on the subscriber line 16, a Goertzel Discrete Fourier Transform (GDFT) unit 110 adapted to transform the time domain samples of the receiver 75 to frequency domain energy values, a gain unit 115 adapted to scale the output of the GDFT unit 110 based on any asymmetry in sample sizes, a screening unit 120 adapted to perform a low-level thresholding function, a cross-frame energy level unit 125 adapted to compare frequency energy levels across frames of data, and a signal alignment unit 130 adapted to determine misalignment between the frames.

It is contemplated that any or all of the functions of the receiver 75, GDFT unit 110, gain unit 115, screening unit 120, cross-frame energy level unit 125, and signal alignment unit 130 may be accomplished by the digital signal processor 80. The memory 85 may be a read-only memory, a random access memory, or a combination thereof. The memory 85 may be employed to store program instructions for execution by the digital signal processor 80. Also, the results of calculations completed by the digital signal processor 80 may be stored in the memory 85. It is also contemplated that a microprocessor (not shown) or other type of general purpose processor (not shown) may be used to perform any or all of the functions of the receiver 75, GDFT unit 110, gain unit 115, screening unit 120, cross-frame energy level unit 125, and signal alignment unit 130.

In the illustrated embodiment, the receiver 75 samples at a frequency of 8 kHz, a common sampling frequency used in telephone systems. The time domain sampling data provided by the receiver 75 is received by the GDFT unit 110. The GDFT unit 110 determines energy output values $|Y_k(n)|^2$ at various frequency bins as described above.

Because the sampling frequency, F, is predetermined (e.g., 8 kHz), only the number of samples N may be varied to center the tone frequency, $f$ within a frequency bin. The values of N used by the GDFT unit 110 in the illustrated embodiment for each of the tones in the CAS signal and their associated errors are shown below in Table 1.

TABLE 1

| f (tone) | N | k (float) | k (integer) | Absolute Error in k | Goertzel Coefficient |
|---|---|---|---|---|---|
| 2130 | 169 | 44.99625 | 45 | 0.00375 | −0.0204126297 |
| 2750 | 160 | 55.0 | 55 | 0 | −1.111140466 |

Because the values of N are different for each of the tones in the CAS signal, the energy output values (i.e., defined by Equation 6) should be normalized prior to comparison. A gain adjust unit 115 receives the raw energy output values from the GDFT unit 110 and scales the energy output value for the 2750 Hz signal by the normalization ratio:

$$\left(\frac{169}{160}\right)^2 = 1.115664063. \qquad \text{Equation 6}$$

The output of the gain adjust unit 115 is received by a screening unit 120. The screening unit 120 evaluates the energy output values for each frame (i.e., set of N samples) to determine if the CAS signal is present. The DTMF detector 35 stores energy output values for six frames of data. The current frame is referred to as frame 0. The DTMF detector 35 also stores the previous frame (frame −1) and the four frames following the current frame (frames 1 through 4).

The screening unit 120 performs a test to determine if the energy output value in a frequency bin for the current frame (i.e., frame 0) passes a predetermined screening threshold. The screening threshold is intentionally set at a relatively low value (i.e., 10 in the illustrated embodiment). The CAS signal may have been received by the DTMF detector 35 in the middle of the initial frame (frame 0). Accordingly, the energy output values would only reflect a partial frame of CAS signal data, and a valid CAS signal might be rejected if the screening threshold is set too high. The screening unit 120 may pass a valid CAS signal, but it may also pass an imitation signal, such as voice or noise. Further testing seeks to reject the imitation signals in favor of actual CAS signals to improve the noise immunity of the DTMF detector 35.

If the screening unit 120 detects a possible valid tone, the next two energy output values (i.e., frames 1 and 2) for the frequency bin are provided to the cross-frame energy level unit 125. Based on the timing of the CAS signal, frames 1 and 2 should represent full energy frames of CAS signal data, assuming a valid CAS signal is present. The cross-frame energy level unit 125 evaluates the energy output values for frames 1 and 2 to determine cross-frame energy and twist measurements.

If both of the cross-frame energy level and twist tests pass, the DTMF detector 35 proceeds with detection of the CAS signal. A method and apparatus for performing the cross-frame energy level and twist tests is described in U.S. patent application Ser. No. 09/159,143, entitled "Cross-Frame Dual tone Multifrequency Detector," filed on the same date as this application, and incorporated herein by reference in its entirety.

The signal alignment unit 130 evaluates the frames of data to determine the amount of misalignment between the 2130 Hz and 2750 Hz signals. As stated above, the energy in frame 0 typically represents a partial frame of data. By comparing the partial energy in frame 0 for the 2130 Hz signal to the partial energy in frame 0 for the 2750 Hz signal, an estimate of the misalignment between the signals is determined. Based on the timing of the CAS signal tones compared to the number of samples in a frame, the energy values in frames 1 and 2 should represent full frames of data (i.e., N=169 samples for 2130 Hz and N=160 samples for 2750 Hz). Assuming the energy detected represents a valid CAS signal, the energy present in the partial frame should be from the CAS signal. The frame energy is proportional to the square of the analysis length (i.e., the number of samples in the frame). The equation for determining the number of samples in a partial energy frame, based on this relationship, is:

$$(N_{Partial\ Frame})^2 = \frac{(N_{Full\ Frame})^2 \cdot E_{Partial}}{E_{avg}}, \quad \text{Equation 7}$$

where $E_{Partial}$ represents the energy in the partial frame, and $E_{avg}$ represents the average energy measured in full energy frames 1 and 2.

The number of samples in a partial energy frame attributable to the CAS signal is compared between the two tones to detect misalignment therebetween. The misalignment is calculated for the beginning and end partial energy frames (i.e., frame −1 or 0 and frame 3 or 4).

Figure 4:
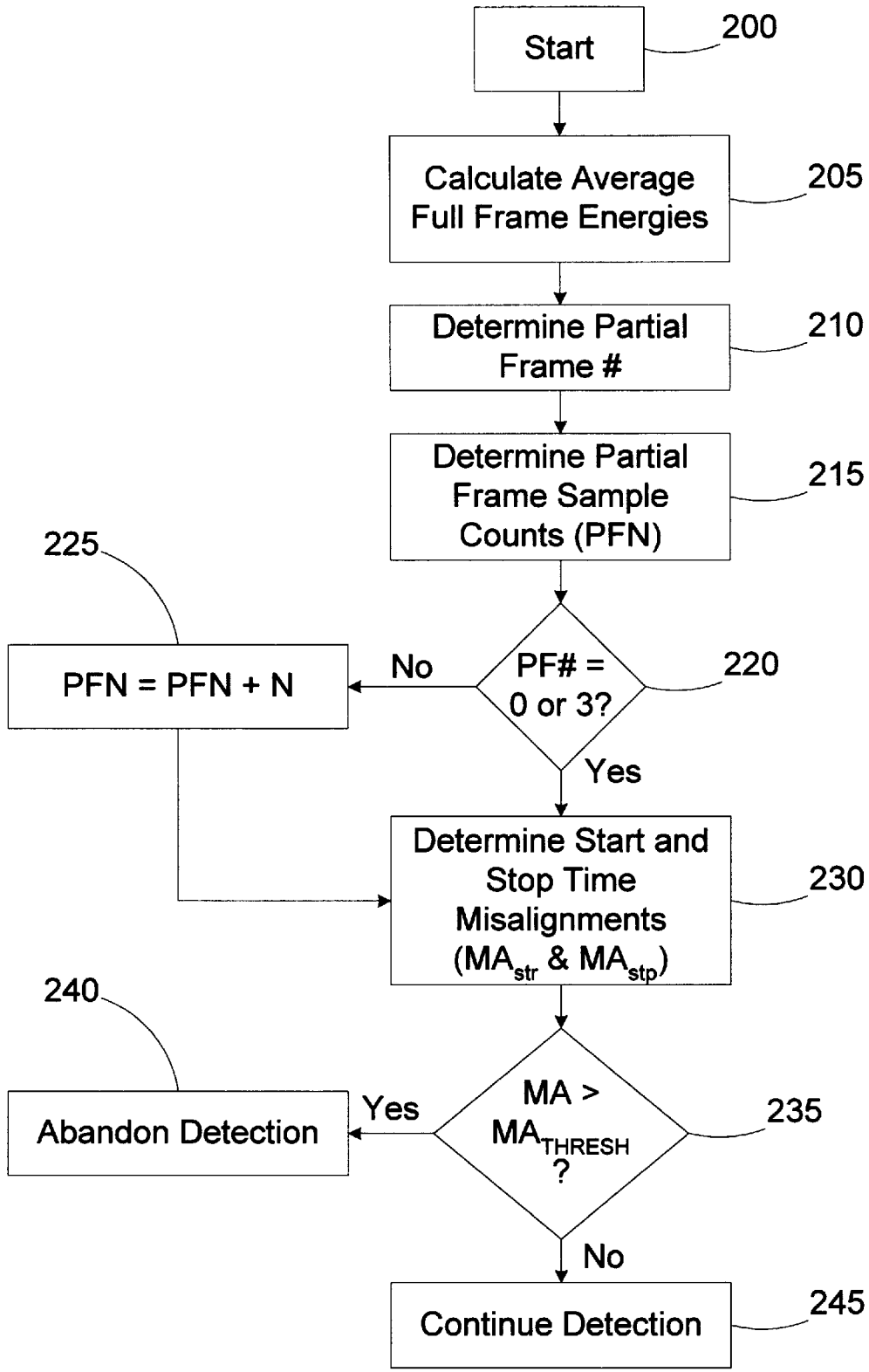
FIG. 4 is a flow chart of a method for detecting signal misalignment in accordance with the present invention.

Referring to FIG. 4, a flow chart of a method for performing the signal misalignment twist measurements is provided. The signal misalignment test is entered in block 200. The average full frame energy values for the 2130 Hz and 2750 Hz signals are calculated in block 205. The partial energy frame numbers are identified in block 210. Depending on the time when the CAS signal was received, it is possible that frame 0 may represent a full energy frame. The average energy values are multiplied by a partial frame scaling factor to determine a partial frame threshold. If the energy in frame 0 is greater than the partial frame threshold, frame 0 is considered a full energy frame. The energy in frame −1 is then evaluated to determine the number of samples in its partial frame. The number of samples in frame 0 (N) is added to the partial number determined in frame −1 to generate the sample count used for comparison with the partial energy frame for the other tone. In the illustrated embodiment, the partial frame scaling factor is about 0.5. Other partial frame scaling factors are contemplated, depending on the specific application. A similar process is used to determine which of frames 3 and 4 represent partial energy frames. It is contemplated that the signal alignment unit 130 frames 0 and 3 may be assumed to be partial energy frames and the partial frame scaling factor may be omitted.

The partial frame sample counts (PFN) for the two tones are calculated for the leading and trailing portions of the frame data in block 215. If the partial energy frame is determined in block 220 to be frame 0 or frame 3, no adjustment to the frame count is necessary. Otherwise, the full frame sample count N for the tone is added to the partial frame sample count in block 225 (i.e., PFN=frame 0 or 3 samples {N}+frame −1 or 4 samples {PFN}). It is conceivable that the CAS signal tones may be misaligned across frames (i.e., PF#=0 or 3 for one tone and −1 or 4 for the other tone). The partial frame sample counts are determined for the start and stop times of the CAS signal. The start and stop time sample counts are determined for each tone.

Based on the sample counts, start time and stop time misalignments are calculated in block 230 by subtracting the partial frame sample counts of the two tones (i.e., MA=|PFN (2130)−PFN(2750)|. The start and stop time misalignments are compared to a threshold in block 235. If either of the start and stop times exceeds the misalignment threshold, the detection is abandoned in block 240. Otherwise, the detection is continued in block 245. It is contemplated that additional tests may be performed subsequent to the misalignment test.

Interference cause by imitation signals can affect the apparent starting and or stopping times of the received CAS signal tones. Accordingly, the misalignment threshold used for rejecting the detection based on frame misalignment involves a tradeoff between immunity to imitation signals (i.e., talk-off) and the ability to correctly detect the CAS signal in the presence of imitation signals (i.e., talk-down). Also, the selection of the partial frame scaling factor involves a similar trade-off.

In the illustrated embodiment, the misalignment threshold is about 70 samples (i.e., 8.75 ms). Other thresholds are contemplated, depending on the specific application and the level of acceptable talk-down or talk-off performance. For example, in an application where speech interference is not expected, the misalignment threshold may be lowered to about 20 samples (i.e., 2.5 ms).

After completing the misalignment tests, the digital signal processor 80 may set a flag indicating a detection or may set a flag indicating no detection. The flag may be an internal flag within the digital signal processor 80 or a flag within the memory 85.

The operation of the signal alignment unit 130 in accordance with the method of FIG. 4 is illustrated by the following examples. The examples are provided for illustrative purposes and are not to be interpreted as limiting the application of the present invention.

A first set of hypothetical energy values is illustrated below in Table 2. The values of Table 2 were obtained by supplying a −32 dBm CAS signal to the DTMF detector 35 having a duration of 80 ms.

TABLE 2

| Frame # | 2130 Hz energy | 2750 Hz energy |
|---|---|---|
| 0 | 30 | 30 |
| 1 | 37 | 36 |
| 2 | 35 | 36 |
| 3 | 27 | 32 |

The average energy values for frames 1 and 2 are 36 for both tones. For ease of illustration, it is assumed that frames 0 and 3 are partial energy frames (i.e., partial frame scaling factor=1). Note that because the energy values are normalized by the gain unit 115, the sample value for the 2130 Hz tone (i.e., N=169) is used as the number of samples in a full frame for both tones.

The partial frame energies are determined using Equation 7. The partial frame sample count for both tones in frame 0 is:

$$(N_0)^2 = \frac{30 \cdot 169^2}{36} \quad N_0 = 154.$$

Also, from equation 7, the partial frame sample counts for frame 3 are 146 (2130 Hz) and 159 (2750 Hz). The start times of the two tones are in perfect alignment (i.e., both have 154 samples). The stop times are misaligned by 159−146=13 samples, or 1.625 ms. The misalignment is less than the 70 sample alignment threshold for the stop time, so the detection continues.

A second set of hypothetical energy values is illustrated below in Table 3. The values of Table 3 were obtained by supplying a −14 dBm CAS signal for 75 ms.

TABLE 3

| Frame # | 2130 Hz energy | 2750 Hz energy |
| --- | --- | --- |
| −1 | 82 | 36 |
| 0 | 2248 | 2170 |
| 1 | 2231 | 2204 |
| 2 | 2236 | 2256 |
| 3 | 330 | 372 |

The average energy values for frames 1 and 2 are 2234 (2130 Hz) and 2230 (2750 Hz). Using a partial frame scaling factor of 0.5, frame 0 is determined to be a full energy frame for both tones. Also, frame 3 is determined to be a partial energy frame for both tones. The misalignment test is thus performed using frames −1 and 3.

The partial frame energies are determined using Equation 7. The partial frame sample counts for the tones in frame −1 are 32+169=201 (2130 Hz) and 21+169=190 (2750 Hz). The partial frame sample counts for the tones in frame 3 are 65 (2130 Hz) and 69 (2750 Hz).

The start times of the two tones are misaligned by 11 samples (i.e., 1.375 ms), and the stop times are misaligned by 4 samples (i.e., 0.5 ms). The misalignments in the start and stop times are less than the 70 sample alignment threshold, so the detection continues.

A third set of hypothetical energy values is illustrated below in Table 4. The values of Table 4 were obtained by supplying a −9 dBm speech and music signal to the DTMF detector 35.

TABLE 4

| Frame # | 2130 Hz energy | 2750 Hz energy |
| --- | --- | --- |
| −1 | 88 | 8 |
| 0 | 80 | 77 |
| 1 | 194 | 135 |
| 2 | 196 | 122 |
| 3 | 180 | 63 |
| 4 | 72 | 89 |

The average energy values for frames 1 and 2 are 195 (2130 Hz) and 128 (2750 Hz). Using a partial frame scaling factor of 0.5, frame 0 is determined to be a partial energy frame for both tones. For the 2130 Hz tone, frame 3 is determined to be a fill energy frame (i.e., frame 4 is a partial energy frame). For the 2750 Hz tone frame 3 is determined to be a partial energy frame. From the partial frame determination, it is evident that the stop times are misaligned across frames. The misalignment test is performed using frame 0 for the start time and frames 3 and 4 for the stop time.

The partial frame energies are determined using Equation 7. The partial frame sample counts for the tones in frame 0 are 108 (2130 Hz) and 131 (2750 Hz). The partial frame sample counts for the tones in frames 3 and 4 are 102+169=271 (2130 Hz) and 118 (2750 Hz).

The start times of the two tones are misaligned by 23 samples (i.e., 2.875 ms), and the stop times are misaligned by 153 samples (i.e., 19.125 ms). The misalignments in the start times is less than the 70 sample alignment threshold, but the misalignment in the stop times is greater than 70 samples, so the detection is abandoned.

The examples listed above illustrate the improved immunity of the DTMF detector 35 to false detections produced by imitation signals, such as voice and noise. Although the present invention is described in reference to the detection of a specific DTMF signal, the CAS signal, the application of the present invention is not so limited. The apparatus and methods described herein may be applied to improve the immunity of other in-band signaling detectors (not shown) to the presence of imitation signals in tone detection applications. It is also contemplated that the present invention may be applied to a multi-tone multi-frequency (MTMF) detector for detecting any number of tones in a received signal (i.e., two or more tones).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A signal detector, comprising:
    a transform unit adapted to receive a plurality of frames of time domain input samples and generate a plurality of energy values based on the frames of time domain input samples, each energy value being associated with one of the plurality of frames; and
    a signal alignment unit adapted to identify at least a first partial energy frame and a second partial energy frame from the plurality of frames, the first partial energy frame being associated with a first frequency and having a first energy value, and the second partial energy frame being associated with a second frequency and having a second energy value, wherein the signal alignment unit determines a misalignment between the first and second partial energy frames based on the first and second energy values.

2. The signal detector of claim 1, further comprising:
    a receiver adapted to sample an input signal and generate the plurality of frames of time domain input signal samples.

3. The signal detector of claim 1, wherein the signal alignment unit is further adapted to determine a first partial frame sample count for the first partial energy frame and a second partial frame sample count for the second partial energy frame, the misalignment being based on the difference between the first and second partial frame sample counts.

4. The signal detector of claim 1, wherein the misalignment comprises a start time misalignment.

5. The signal detector of claim 1, wherein the misalignment comprises a stop time misalignment.

6. The signal detector of claim 3, wherein a subset of the energy values is associated with the first frequency, and the signal alignment unit is adapted to identify at least one full energy frame from the plurality of frames based on the subset, the first partial frame sample count being based on the first energy value, the number of time domain input samples in the fall energy frame, and the energy value of the full energy frame.

7. The signal detector of claim 6, wherein the first partial frame sample count is based on the square of the number of time domain input samples in the full energy frame.

8. The signal detector of claim 3, wherein a subset of the energy values is associated with the second frequency, and the signal alignment unit is adapted to identify at least one full energy frame from the plurality of frames based on the subset, the second partial frame sample count being based on the second energy value, the number of time domain input samples in the full energy frame, and the energy value of the full energy frame.

9. The signal detector of claim 8, wherein the second partial frame sample count is based on the square of the number of time domain input samples in the full energy frame.

10. The signal detector of claim 3, wherein the first partial energy frame and the second partial energy frame are separated by a time interval, and the signal alignment unit is adapted to determine the misalignment between the first and second partial energy frames based on the first and second energy values and the time interval.

11. A dual tone signal detector, comprising:
   a transform unit adapted to receive a plurality of frames of time domain input samples and generate a plurality of energy values based on the frames of time domain input samples, a first plurality of the energy values being associated with a first tone of the dual tone signal and a second plurality of the energy values being associated with a second tone of the dual tone signal; and
   a signal alignment unit adapted to determine at least one of a first start time and a first stop time for the first tone based on the first plurality of energy values, at least one of a second start time and a second stop time for the second tone based on the second plurality of energy values, and a misalignment between at least one of the first and second start times and the first and second stop times.

12. A signal detector, comprising:
   a processor adapted to receive a plurality of frames of time domain input samples; and
   a memory device coupled to the processor and adapted to store program instructions, that when executed by the processor:
      generate a plurality of energy values based on the frames of time domain input samples, each energy value being associated with one of the plurality of frames;
      identify at least a first partial energy frame and a second partial energy frame from the plurality of frames, the first partial energy frame being associated with a first frequency and having a first energy value, and the second partial energy frame being associated with a second frequency and having a second energy value; and
      determine a misalignment between the first and second partial energy frames based on the first and second energy values.

13. The signal detector of claim 12, further comprising:
   a receiver coupled to the processor and adapted to sample an input signal and generate the plurality of frames of time domain input signal samples.

14. The signal detector of claim 12, wherein the program instructions, when executed by the processor,
   determine a first partial frame sample count for the first partial energy frame and a second partial frame sample count for the second partial energy frame, the misalignment being based on the difference between the first and second partial frame sample counts.

15. The signal detector of claim 12, wherein the program instructions that determine the misalignment, when executed by the processor, determine a start time misalignment.

16. The signal detector of claim 12, wherein the program instructions that determine the misalignment, when executed by the processor, determine a stop time misalignment.

17. The signal detector of claim 14, wherein a subset of the energy values is associated with the first frequency, and the program instructions that determine the first partial frame sample count, when executed by the processor:
   identify at least one full energy frame from the plurality of frames based on the subset; and
   determine the first partial frame sample count based on the first energy value, the number of time domain input samples in the full energy frame, and the energy value of the full energy frame.

18. The signal detector of claim 14, wherein a subset of the energy values is associated with the second frequency, and the program instructions that determine the second partial frame sample count, when executed by the processor:
   identify at least one full energy frame from the plurality of frames based on the subset; and
   determine the second partial frame sample count based on the second energy value, the number of time domain input samples in the full energy frame, and the energy value of the full energy frame.

19. The signal detector of claim 14, wherein the first partial energy frame and the second partial energy frame are separated by a time interval, and the program instructions that determine the misalignment, when executed by the processor, determine the misalignment between the first and second partial energy frames based on the first and second energy values and the time interval.

20. A method for detecting a signal, comprising:
   generating a plurality of energy values based on the frames of time domain input samples, each energy value being associated with one of the plurality of frames;
   identifying at least a first partial energy frame and a second partial energy frame from the plurality of frames, the first partial energy frame being associated with a first frequency and having a first energy value, and the second partial energy frame being associated with a second frequency and having a second energy value; and
   determining a misalignment between the first and second partial energy frames based on the first and second energy values.

21. The method of claim 20, further comprising:
   receiving an input signal; and
   sampling the input signal to generate the plurality of frames of time domain input signal samples.

22. The method of claim 20, wherein determining the misalignment includes:
   determining a first partial frame sample count for the first partial energy frame and a second partial frame sample count for the second partial energy frame, the misalignment being based on the difference between the first and second partial frame sample counts.

23. The method of claim 20, wherein determining the misalignment comprises determining a start time misalignment.

24. The method of claim 20, wherein determining the misalignment comprises determining a stop time misalignment.

25. The method of claim 22, wherein a subset of the energy value s is associated with the first frequency, and determining the first partial frame sample count includes:

identifying at least one full energy frame from the plurality of frames based on the subset; and determining the first partial frame sample count based on the first energy value, the number of time domain input samples in the full energy frame, and the energy value of the fill energy frame.

26. The method of claim 22, wherein a subset of the energy values is associated with the second frequency, and determining the second partial frame sample count includes:

identifying at least one full energy frame from the plurality of frames based on the subset; and determining the second partial frame sample count based on the second energy value, the number of time domain input samples in the full energy frame, and the energy value of the full energy frame.

27. The signal detector of claim 22, wherein the first partial energy frame and the second partial energy frame are separated by a time interval, and determining the misalignment includes determining the misalignment between the first and second partial energy frames based on the first and second energy values and the time interval.

28. A method for detecting a dual tone signal, comprising:

receiving a plurality of frames of time domain input samples;

generating a plurality of energy values based on the frames of time domain input samples, a first plurality of the energy values being associated with a first tone of the dual tone signal and a second plurality of the energy values being associated with a second tone of the dual tone signal;

determining at least one of a first start time and a first stop time for the first tone based on the first plurality of energy values;

determining at least one of a second start time and a second stop time for the second tone based on the second plurality of energy values; and determining a misalignment between at least one of the first and second start times and the first and second stop times.

29. A signal detector, comprising:

means for receiving a plurality of frames of time domain input samples;

means for generating a plurality of energy values based on the frames of time domain input samples, each energy value being associated with one of the plurality of frames;

means for identifying at least a first partial energy frame and a second partial energy frame from the plurality of frames, the first partial energy frame being associated with a first frequency and having a first energy value, and the second partial energy frame being associated with a second frequency and having a second energy value; and means for determining a misalignment between the first and second partial energy frames based on the first and second energy values.

\* \* \* \* \*